US011713944B2

(12) United States Patent
Ehrlich et al.

(10) Patent No.: US 11,713,944 B2
(45) Date of Patent: Aug. 1, 2023

(54) DUAL MODE WEAPON-MOUNTED FIRE CONTROL SYSTEM

(71) Applicant: SMART SHOOTER LTD., Kibbutz Yagur (IL)

(72) Inventors: Avshalom Ehrlich, Kibbutz Ramat Hashofet (IL); Tzach Arnon, Yodfat (IL)

(73) Assignee: SMART SHOOTER LTD., Kibbutz Yagur (IL)

( * ) Notice: Subject to any disclaimer, the term of this patent is extended or adjusted under 35 U.S.C. 154(b) by 207 days.

(21) Appl. No.: 17/361,434

(22) Filed: Jun. 29, 2021

(65) Prior Publication Data

US 2022/0205762 A1 Jun. 30, 2022

Related U.S. Application Data

(60) Provisional application No. 63/132,571, filed on Dec. 31, 2020.

(51) Int. Cl.
| | |
|---|---|
| *F41G 3/02* | (2006.01) |
| *G06T 7/20* | (2017.01) |
| *F41A 17/08* | (2006.01) |
| *F41A 23/14* | (2006.01) |
| *F41A 23/24* | (2006.01) |
| *F41G 5/06* | (2006.01) |

(52) U.S. Cl.
CPC ............... *F41G 3/02* (2013.01); *F41A 17/08* (2013.01); *F41A 23/14* (2013.01); *F41A 23/24* (2013.01); *F41G 5/06* (2013.01); *G06T 7/20* (2013.01)

(58) Field of Classification Search
CPC ... F41G 3/02; F41G 5/06; F41A 17/08; F41A 23/14; F41A 23/24; G06T 7/20
USPC .......................................................... 235/404
See application file for complete search history.

(56) References Cited

U.S. PATENT DOCUMENTS

| | | | | |
|---|---|---|---|---|
| 2015/0108215 | A1* | 4/2015 | Ehrlich | ..................... F41G 3/12 235/404 |
| 2019/0137219 | A1* | 5/2019 | Bockmon | ................. F41G 5/16 |
| 2021/0140733 | A1* | 5/2021 | Herskowitz | ............. F41A 17/08 |
| 2022/0034630 | A1* | 2/2022 | Bilbrey | ..................... F41G 5/18 |
| 2022/0146231 | A1* | 5/2022 | Sitrick | ...................... F41G 3/06 |

* cited by examiner

*Primary Examiner* — Daniel A Hess
(74) *Attorney, Agent, or Firm* — Mark M. Friedman

(57) ABSTRACT

A weapon-mounted Fire Control System (FCS) for a handheld weapon includes an imaging sensor and a processing system configured to operate in two modes. In a first mode, for handheld operation of the weapon, the processing system tracks a target, determines an aim-region with which the weapon should be aligned for firing in order to strike the target, and generates an output to facilitate accurate firing of the weapon towards the aim region. The output may indicate the aim region on a display, and/or may control a firing control mechanism. In a second mode, when the weapon is on an adjustable weapon support, the processor tracks a target, determines an aim-region, and generates output signals for controlling operation of at least one actuator of the adjustable weapon support in order to align the weapon with the aim region.

8 Claims, 12 Drawing Sheets

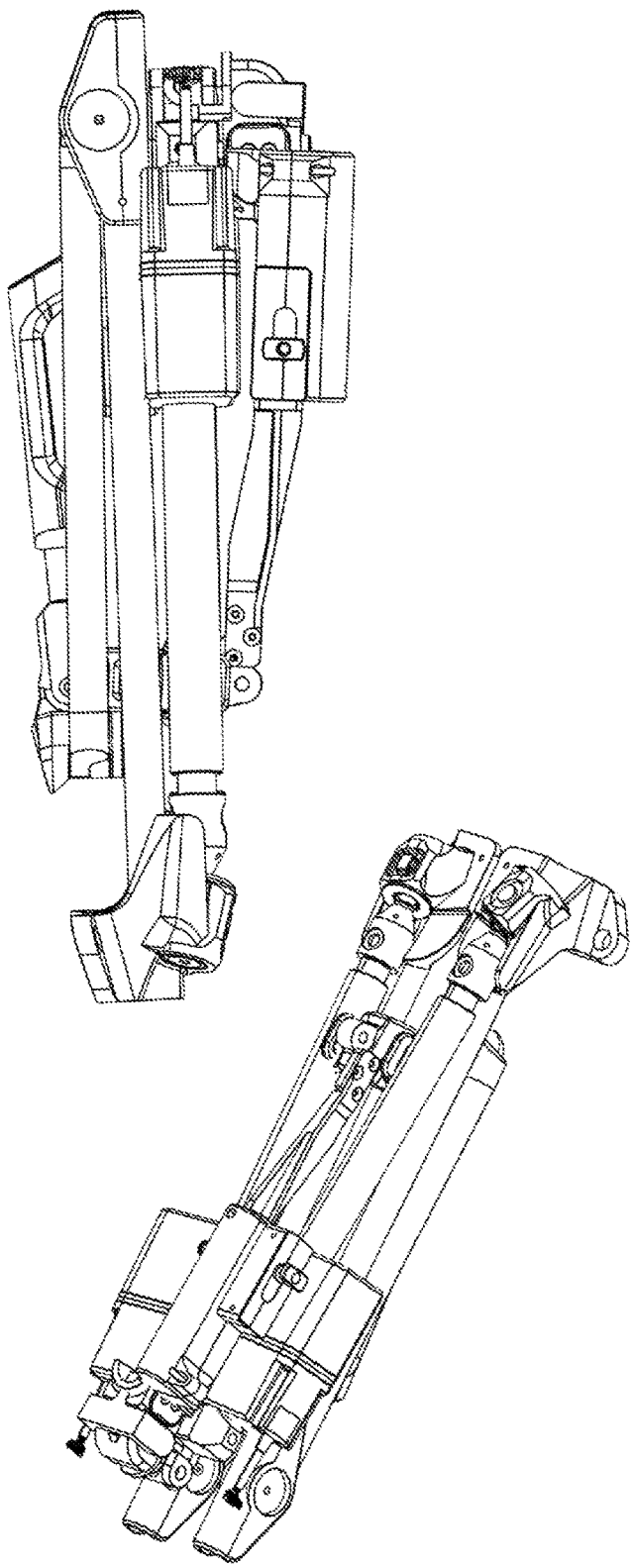
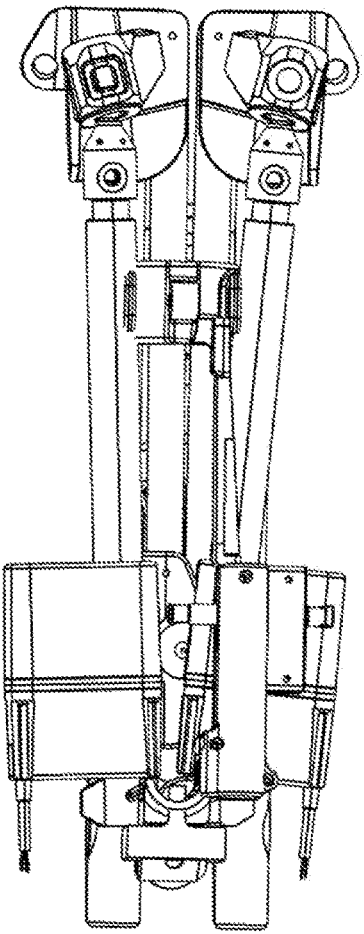
FIG. 6B
FIG. 6C
FIG. 6A

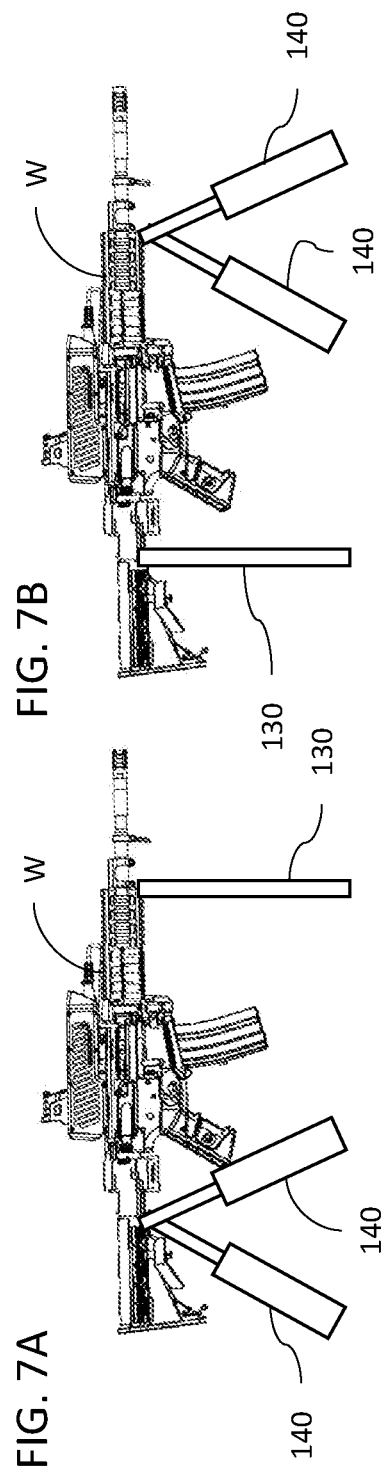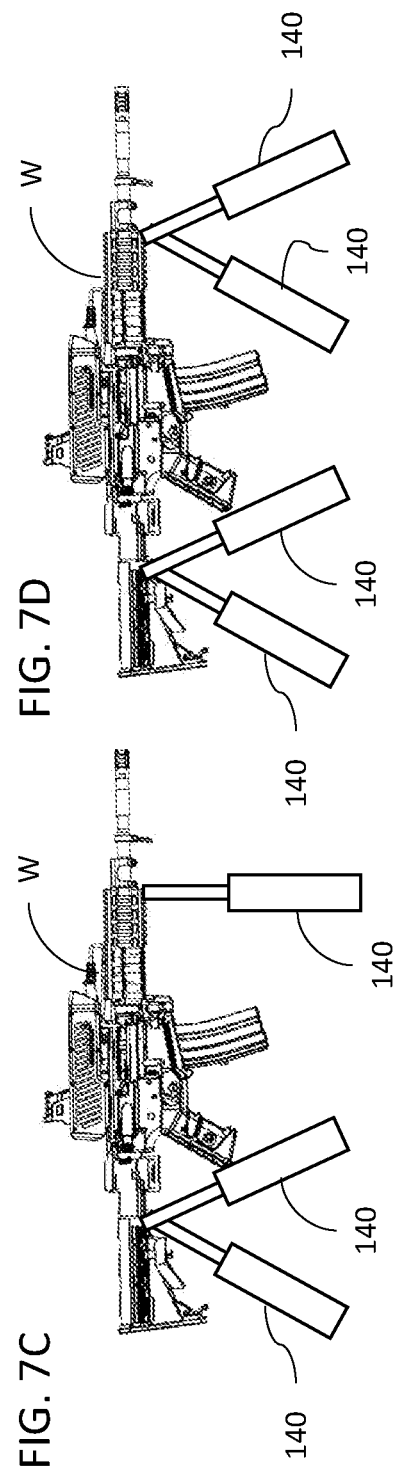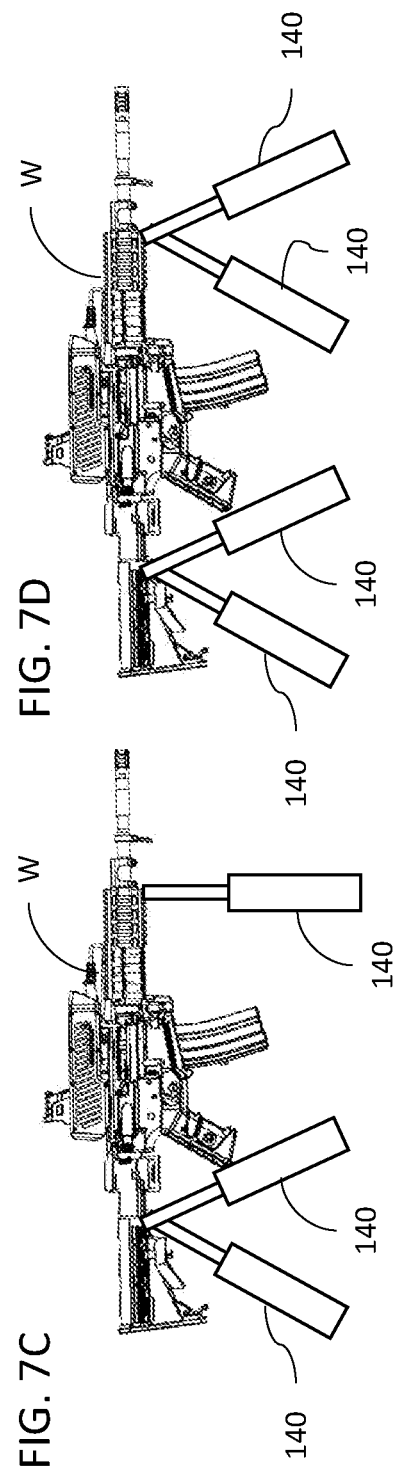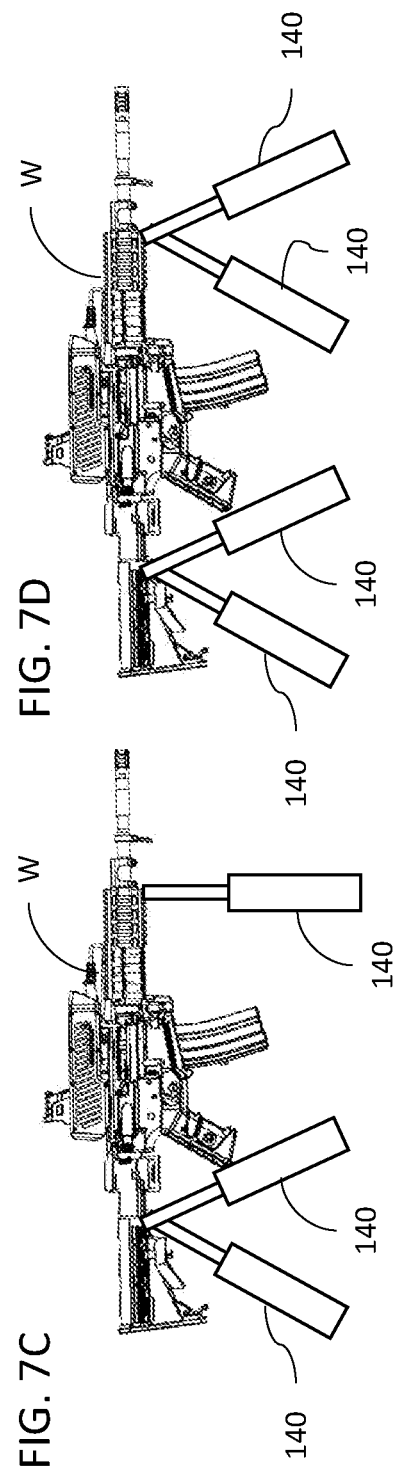

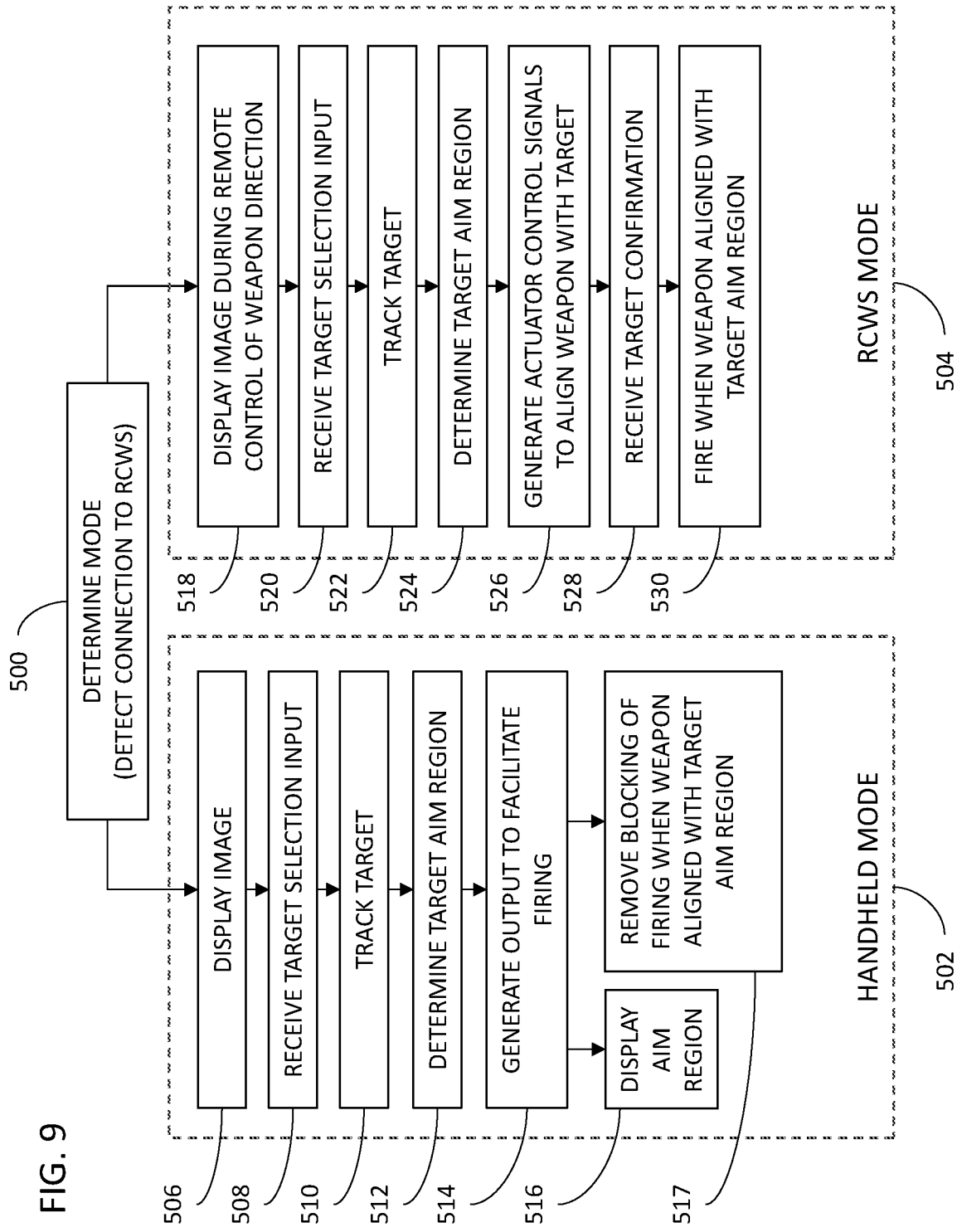

DUAL MODE WEAPON-MOUNTED FIRE CONTROL SYSTEM

FIELD OF THE INVENTION

The present invention relates to a weapon-mounted Fire Control System, and, more particularly, to a dual-mode fire control system. The present invention also relates to remote controlled weapons systems.

BACKGROUND OF THE INVENTION

A fire control system integrated with a weapon sight for small arms and light weapons (SALW) is disclosed by Ehrlich in U.S. Pat. No. 10,097,764 which is incorporated in its entirety as if fully set forth herein.

SUMMARY OF THE INVENTION

The present invention is a weapon-mounted Fire Control System (FCS) for a handheld weapon.

Thus, according to the teachings of an embodiment of the present invention, there is provided a weapon-mounted Fire Control System (FCS) for a handheld weapon, the FCS comprising: (a) an imaging sensor deployed for sampling images of a target; and (b) a processing system comprising at least one processor, the processing system receiving images from the imaging sensor, the processing system being configured: (i) to operate in a first mode for handheld operation of the weapon wherein the processing system tracks a target in images from the imaging sensor during motion of the weapon while the weapon is handheld, determines an aim-region with which the weapon should be aligned for firing in order to strike the target, and generates an output to facilitate accurate firing of the weapon towards the aim region, and (ii) to operate in a second mode when the weapon is mounted on an adjustable weapon support having at least one actuator wherein the processor tracks a target in images from the imaging sensor, determines an aim-region with which the weapon should be aligned for firing in order to strike the target, and generates output signals for controlling operation of the at least one actuator in order to align the weapon with the aim region.

According to a further feature of an embodiment of the present invention, there is also provided a display, and the output to facilitate accurate firing of the weapon towards the aim region includes an output to the display for indicating the aim region to a user of the weapon.

According to a further feature of an embodiment of the present invention, the output to facilitate accurate firing of the weapon towards the aim region includes an output to a firing control mechanism for actuating, or deactivating prevention of, firing of the weapon when the handheld weapon is aligned with the aim region.

According to a further feature of an embodiment of the present invention, there is also provided a firing control mechanism for selectively preventing firing of the weapon, the firing control mechanism preventing firing of the weapon after pulling of a mechanical trigger of the weapon until the output is received from the processing system.

According to a further feature of an embodiment of the present invention, there is also provided at least one interface associated with the processing system for connecting the processing system with the adjustable weapon support, the processing system being responsive to connection of the interface to the adjustable weapon support to switch from the first mode to the second mode.

According to a further feature of an embodiment of the present invention, there is also provided: (a) a remote-control weapon system interface including a display and a user input device; and (b) a communications system including a first subsystem associated with the processing system and a second subsystem associate with the remote-control weapon system interface, the communications system establishing a communications link transferring images from the imaging sensor to the remote-control weapon system interface for display to a user, and transferring a target selection input from the user input device to the processing system.

According to a further feature of an embodiment of the present invention, there is also provided a trigger-pulling mechanism associated with the adjustable weapon support and deployed for selectively pulling a trigger of the weapon.

According to a further feature of an embodiment of the present invention, there is also provided an adjustable weapon support for receiving the weapon in the second mode, the adjustable weapon support having at least one actuator, the processing system being configured to acquire a target, to operate the adjustable weapon support to aim the weapon and to fire the weapon autonomously.

BRIEF DESCRIPTION OF THE DRAWINGS

Various embodiments are herein described, by way of example only, with reference to the accompanying drawings, wherein:

FIGS. 6A, 6B and 6C are an isometric view, a side view and a top view, respectively, of the adjustable weapon support of FIG. 4B in a folded state;

FIGS. 7A-7D are schematic side views illustrating variant implementations of an adjustable weapon support employing two or more linear actuators, with or without additional passive support elements;

FIG. 9 is a flow diagram illustrating the modes of operation of the FCS according to an embodiment of the present invention.

DESCRIPTION OF THE PREFERRED EMBODIMENTS

Figure 1:
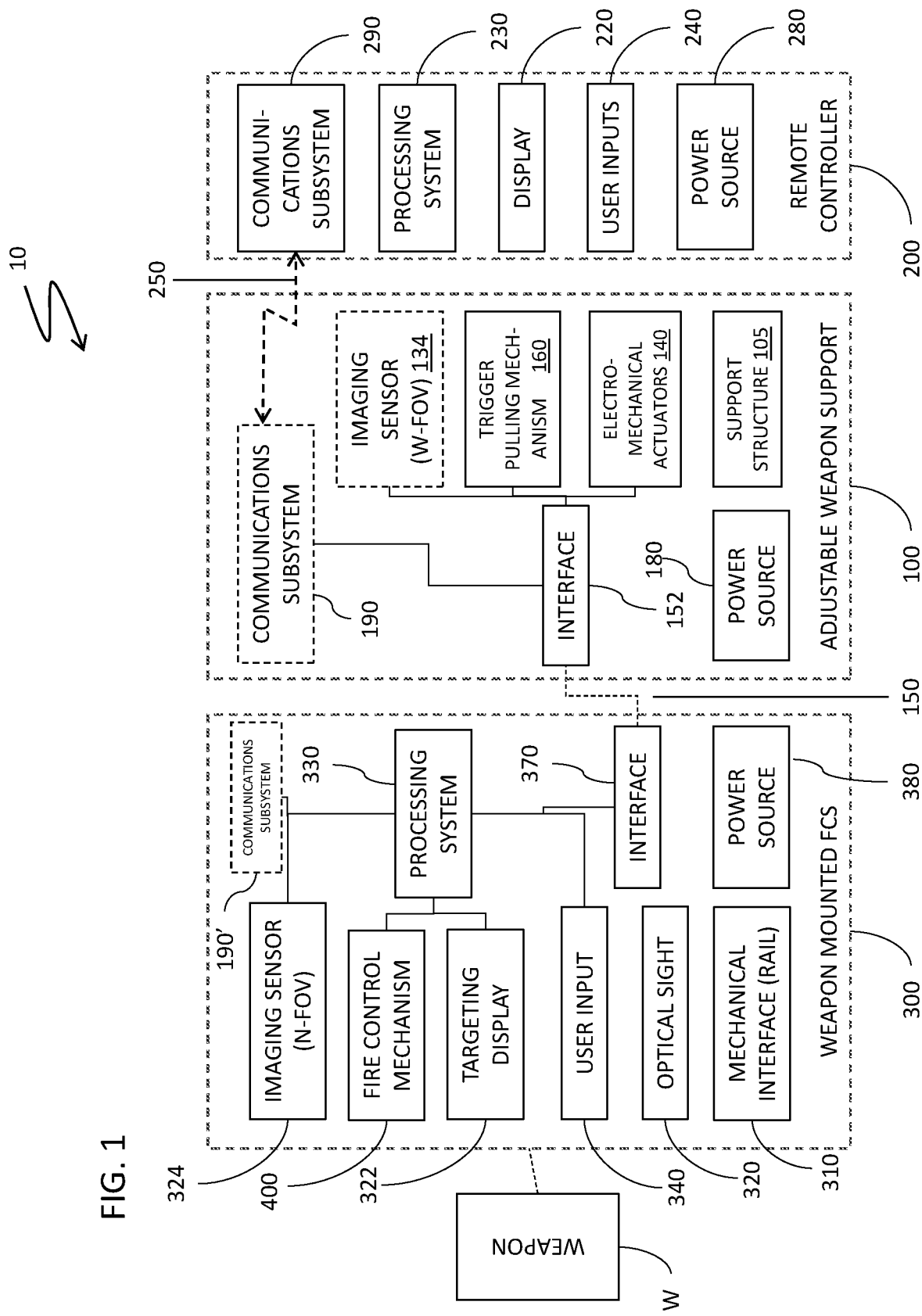
FIG. 1 is a block diagram of a remotely controlled weapon system (RCWS) employing a dual-mode fire-control system (FCS) according to an embodiment of the present invention.

By way of introduction, the present invention seeks to provide enhanced versatility and efficacy for handheld weapons, such as the rifle of an infantry soldier or other combatant. In particular, the invention relates to an add-on or integrated fire-control system (FCS) for handheld weapons which provides both first-shot-hit precision for handheld use and allows instant conversion of the unmodified handheld weapon to operate as part of a remotely-controlled weapon system (RCWS).

Thus, in general terms, an embodiment of the present invention provides a weapon-mounted FCS for controlling firing of a handheld weapon, which includes a firing mechanism for actuating firing of the weapon, an imaging sensor deployed for sampling images of a target, and a processing system comprising at least one processor. The processing system receives images from the imaging sensor and controlling the firing mechanism, and is configured to operate in two distinct modes:

In a first mode, for handheld operation of the weapon, the processing system tracks a target in images from the imaging sensor during motion of the weapon while the weapon is handheld, selectively actuating the firing mechanism only when the weapon is aligned with the target.

In a second mode, the weapon is mounted on an adjustable weapon support having at least one actuator. In this case, the processor tracks a target in images from the imaging sensor and generates output signals for controlling operation of the at least one actuator in order to align the weapon with the target.

This aspect of the present invention will be illustrated below with reference to one particularly preferred but non-limiting example of an adjustable weapon support. It will be appreciated, however, that the principles of this aspect of the present invention may be applied to substantially any sort of adjustable weapon support.

Before proceeding further, it will be helpful to define certain terminology as used herein in the description and claims. The term "handheld weapon" is used herein in the description and claims to refer to any weapon which may be fired while supported at least partially by one or both hands of an operator. It relates in particular to direct fire weapons, where the weapon is aimed directly at a visible target, and particularly to weapons that fire a projectile from a barrel or launch tube. The term typically refers to light arms, such as rifles, but does not exclude larger weapons that may be additionally supported on a shoulder of the operator, or via a bipod or other additional support. The term "handheld weapon" defines the weapon type, even while the weapon is being used on an adjustable weapon mount as part of a remote-controlled weapon system.

The term "fire control mechanism" is used to refer to any mechanism which enables intervention of a controller (processing system) in the firing of the weapon so that the weapon fires on generation of a firing output from the controller. The fire control mechanism may be a fully automated firing system which initiates firing, for example, by generating motion of a firing pin. Alternatively, the fire control mechanism may be a mechanism which delays the result of an external firing input, such as pulling of a trigger, until a release signal is received from the controller. For example, the operator pulls on the trigger, but the final part of the trigger motion is obstructed until the fire control mechanism sends a signal which allows the pulling action of the trigger to be completed, thereby initiating firing. (It is noted that the latter option affords more control to the operator because s/he can release the trigger at any time, so even if the fire control mechanism sends the signal, the weapon will not fire, whereas in the former option, the fire control mechanism completely controls the firing process.)

Where reference is made to an adjustable weapon support having at least one actuator, this refers to any support which holds the weapon and adjusts the position of the weapon in at least one direction in order to contribute to aiming or stabilization of the weapon. Most preferably, the adjustable weapon support includes at least two actuators to allow adjustment of the weapon aim direction in two angular degrees of freedom. The support may be one-point support, as it typically used for gimbal-based systems, providing, for example, elevation-over-azimuth adjustment of the aim direction, as will be illustrated below with reference to FIG. 8. Alternatively, two-point support of the weapon may be combined with two linear actuators, forming what can be described as an active bipod, to adjust the alignment of the weapon relative to a second, fixed support point, which may be either closer to the front (firing direction) or the rear (butt) of the weapon. An arrangement in which both the front and the back of the weapon are supported by adjustable supports also falls within the scope of the invention. For example, both the front and back support points may be supported by an active bipod. Alternatively, in some cases, one support may provide a single horizontal adjustment while the other provides a single vertical adjustment, thereby providing a simpler mapping of actuator motion to pan (azimuth) and tilt (elevation). All of these options, and a range of other actuator configurations, are within the capabilities of one ordinarily skilled in the art based on commonly available components, and will not be discussed here in detail.

The adjustable weapon support may be implemented or embodied on an air-borne platform such as a drone, a water-borne platform such as a buoy or a boat, or a land-based platform or vehicle such as a truck or armored vehicle, or a robot.

For the purpose of one particularly-preferred but non-limiting example, the present invention will be illustrated herein in the context of a particularly lightweight, foldable and portable implementation employing a manually-adjustable front support which is fixed during operation and an active bipod rear support with two linear actuators. Such an implementation is described herein in detail with reference to FIGS. 2-6, below. It should however be appreciated that the present invention is not limited to this application. By way of a further non-limiting example, an alternative adjustable weapon support with two-axis rotary motion providing elevation over azimuth alignment will be illustrated with reference to FIG. 8, below.

The two modes of operation of the FCS according to an aspect of the present invention may be referred to as a "slave mode" and a "master mode", as will be further described below.

Slave Mode

The first aspect of functionality of the FCS of the present invention is preferably implemented substantially according to the teachings of US Pat. No. 10,197,764 B2, which is coassigned with the present invention, and corresponds to commercial products marketed under the name SMASH from Smart Shooter Ltd. (Israel).

To better understand the process, the FCS is discussed in greater detail. One exemplary FCS is the SMASH 2000 FCS, which may also be referred to as a "(smart) sight", manufactured by Smart Shooter Ltd. (Kibbutz Yagur, Israel). The SMASH 2000 sight includes, at least, an image sensor, a microcomputer and a micro display. The imagery is acquired by an image sensor and processed in real time by a microcomputer. This image processing allows the sight to detect and track stationary and moving targets, both on the ground and in the air.

The sight automatically and/or under user operation highlights, locks onto and tracks potential targets. The system also presents to the user a "firing zone", that represents aim correction that takes into account the necessary ballistics corrections, including target movement. SMASH 2000 sight module is an FCS by itself and can significantly improve operator fire accuracy.

The sight is mounted on a weapon and the operator wields the handheld weapon with the mounted sight in the field. The sight preferably has multiple operational modes: a see-through reflex sight (red-dot) for rapid fire; a day mode for fire control assisted shots using see-through projected markers; and a night mode for fire control assisted shots using video display. In both Day and Night modes (see-through and video modes), the symbols of 'locked' target, 'firing zone' and other symbols are superimposed on top of the view of the real world. The sight includes a micro display on which the symbols are displayed in such a way that they augment the view of the real world.

The difference between Night mode and Day mode is that in Night mode, the real world is shown to the user via video projection on the same micro display since the image sensor of the system is much more sensitive than the human eye. In the Day mode, the real-world scene is visible through the see-through optics while the markings are projected onto the scene by the micro display.

The present invention may be implemented with an FCS which provides only visual cues to the user, for example, indicating a target aim region that is derived from ballistic calculations and tracking of the target and weapon motions to indicate where the weapon should be directed at the moment of firing in order to achieve a sufficiently high likelihood of hitting the target. Alternatively, like the full SMASH 2000 FCS, the FCS of the present invention may also include a Fire Control Mechanism (FCM), that, in most cases, replaces the original grip of an assault rifle, and is connected to the sight module.

The objective of the FCM is to allow an "assisted shot" mode by timing the bullet discharge on a locked target to a moment when the hit probability is high enough, and by that to minimize the differential effect of the individual shooter (resulting from factors such as stress, fatigue and shooting skills). This timing is provided to FCM by the sight module that performs the necessary calculations based on locked target parameters, user stability, range and more. Working in coordination, sight and FCM modules allow the user to achieve the highest hit rate. This mode is referred to herein as a "slave" mode, in the sense that the FCS does not initiate motion of the weapon, but rather times the bullet discharge on the basis of movement which is generated by the user holding the weapon.

Thus, according to an aspect of the present invention, there is provided a weapon-mounted FCS for controlling firing of a handheld weapon. The FCS includes a fire control mechanism for controlling actuation of the firing mechanism of the weapon. The FCS further includes an imaging sensor deployed for sampling images of a target and a processing system including at least one processor. The processing system receives images from the imaging sensor and controls the fire control mechanism.

According to the first aspect of the of functionality of the FCS of the present invention, the processing system is configured to operate in a first mode for handheld operation of the weapon wherein the processing system tracks a target in images from the imaging sensor during motion of the weapon while the weapon is handheld, determines an aim-region with which the weapon should be aligned for firing in order to strike the target, and generates an output to facilitate firing of the weapon when the handheld weapon is aligned with the aim region. As mentioned, this output may be either a smart-sight display indicating to the user how the weapon should be aligned with the aim region, for example, providing a "disturbed reticle", and/or may be a signal to a fire control mechanism to actively time firing of the weapon with the weapon alignment.

Master Mode

In various situations, particularly when a target can only be fired upon from a location which is exposed or otherwise susceptible to return fire, it would be desirable for a combatant to have use of an RCWS to enable firing on a target to be controlled from a remote location. "Remote" in this context means any location not within reach of the weapon, and may be a sheltered location close by the RCWS, or may be located at any other desired location. An RCWS typically requires an entire dedicated processing system with dedicated imaging sensors, and often requires modification of the weapon itself (e.g., removal of the butt and/or hand grip) and/or a complex calibration procedure to boresight the weapon with various sensors. This may make it impractical to switch rapidly between handheld use of the weapon and use in an RCWS. A dedicated processing system for the RCWS would typically remain on the RCWS if the weapon is removed for manual use, and would thus not provide any enhanced functionality for handheld use.

According to an aspect of the present invention, by employing a dual-mode FCS mounted on the weapon, considerable hardware requirements on the RCWS are inherently addressed without providing addition components, and the main target tracking camera is inherently boresighted with the weapon. Besides avoiding a calibration procedure, this also avoids the need for precision alignment of the weapon on an adjustable weapon support, which in turn facilitates quick mounting of an unmodified handheld weapon on the support without adversely impacting the performance of the system. The use of a dual mode FCS may also provide economies of weight, size and costs compared to use of a dedicated system for each of its functions.

Thus, according to a second aspect of the of functionality of the FCS of the present invention the processing system is configured to operate in a second mode when the weapon is mounted on an adjustable weapon support having at least one actuator wherein said processor tracks a target in images from said imaging sensor, determines an aim-region with which the weapon should be aligned for firing in order to strike the target, and generates output signals for controlling operation of the at least one actuator in order to align the weapon with the calculated aim region in order to strike the target. This mode of operation is referred to herein as a "master" mode of operation, since the FCS in this case takes an active role in controlling motion of the weapon so as to aim the weapon correctly at the target.

The principles and operation of a dual mode, weapon-mounted Fire Control System (FCS) according to the present invention may be better understood with reference to the drawings and the accompanying description.

Referring now to the drawings, FIG. 1 is a high-level block diagram of a system employing a dual-mode FCS according to an embodiment of the present invention.

Referring to FIG. 1, this illustrates a block diagram of the remote-controlled weapons system (RCWS) 10. The RCWS includes an adjustable weapon support 100, a remote controller 200 and a weapon-mounted FCS 300. The weapon mounted FCS 300 is mounted on a weapon W. In embodiments that provide an "assisted shot" feature (a mode which facilitates the weapon discharging the bullet at a precise time, see below for further details), weapon W typically includes a modified grip with an integrated Fire Control Mechanism (FCM) 400 that controls actuation of trigger mechanism of the weapon (the trigger mechanism does not only refer to an actual firearm trigger but rather to any mechanical, electrical and/or electromechanical mechanism that actuates firing of the weapon). The FCM is in communication with the FCS The FCS is integrated into a sight module which is mounted on the weapon W by attaching and affixing a mechanical interface 310 to the Picatinny rail (or other relevant structure) of the weapon. The weapon mounted module is either referred to as the sight module or FCS 300. The FCS 300 depicted in the drawings includes an optical sight 320 which is a see-through aiming optic. This type of sight is merely exemplary and not intended to be limiting in any way. The optic includes a micro-display which is a targeting display 322 that augments the real-world scene as viewed through the see-through optics. The micro-display can also display video. The FCS includes an imaging sensor 324. Imagery captured by the imaging sensor 324 is processed by a processing system 330. The processing system provides outputs to the targeting display 322. The targeting displays aids the operator in hitting their target. The operator interfaces with the FCS (e.g., to select a target to fire on) via a User Input interface 340. The user input interface may be a button or some other type of user control. The user control may be positioned near the barrel handguard or grip so that it can be actuated by firearm operator without removing their hands from the firearm (which is usually held in a two-handed grip, one hand on the handle and the other hand under the handguard).

The System Processor 330 also handles all the processing related to detecting, tracking, calculating a firing solution, actuating the FCM and/or the trigger pulling mechanism. The FCS has a power source 380 (e.g., a rechargeable battery) and an interface 370 for interfacing with the adjustable support 100. The "interface" may be a physical connector, for example employing a cable (e.g., plugging cable 150) to connect the interface 370 of the FCS to the interface 152 of remote-controlled weapon support 100. Alternatively, the interface may be implemented using wireless adaptors which establish a short-range wireless link between the FCS and the remote-controlled weapon support 100.

It is made clear that system processing can take place in any of the hardware components (sight module, support structure, remote console) or can be shared between processors in two or more components. Alternatively, or additionally, processing can take place in a remote location and/or in a cloud. Any configuration that facilitates processing is considered to be within the scope of the invention. In a similar fashion, there may be more than one power source, or a single power source may provide power to more than one component. Again, any configuration for power distribution between the various components is considered to be within the scope of the invention.

Further, the innovative system includes a trigger pulling mechanism 160 that is adapted to control the pulling action of the trigger of the mounted device. The innovative system is in communication (via wired and/or wireless communication subsystems 190 or 190' and 290) with a remote-control console that controls various aspects of the collapsible support and trigger-pulling mechanism. The remote control may communicate with the support or with the weapon-mounted FCS. The remote control may be in wireless communication with one of the components, for example, the FCS and in wired communication with the other component, e.g., the support.

In preferred embodiments, the Fire Control System is configured to autonomously control the collapsible support. Autonomously controlling the weapon support includes, for example, controlling movement of the actuators and firing of the weapon based on tracking of a locked-on target and acquiring a firing solution. There may be different levels of autonomous control, such as partial control after an operator has selected a target or full control as discussed below.

In other embodiments, the RCWS may be completely autonomous with preprogramed operational parameters. For example, the portable weapon support 100 may be configured to be an autonomous, remote weapon system. The FCS can be programmed to detect, recognize and/or identify potential targets and if a target is detected, recognized and/or identified, the FCS locks onto the target, tracks it and fires the munition once a firing solution has been achieved. All this may be without any intervention via the remote controller. Such autonomous operation may be initiated by a command from a remote controller, or may be initiated locally by an operator, without use of a remote controller. Of course, this does not detract from the option of employing other features of the FCS, such as sending imagery and/or other information from the FCS to the controller 200.

The support 100 is described in full detail with reference to FIGS. 2-6 below. At present it is sufficient to indicate that support 100 includes a power source 180 and a communications subsystem 190. The communications subsystem 190 of the support communicates with a corresponding communications subsystem 290 of the remote controller 200. Additionally, or alternatively, the FCS may include a communications subsystem 190', allowing communication directly between the FCS and the remote controller. The remote controller can be in electronic communication with the support (double-ended arrow 250) and/or with the FCS via wired means or wirelessly.

Figure 2:
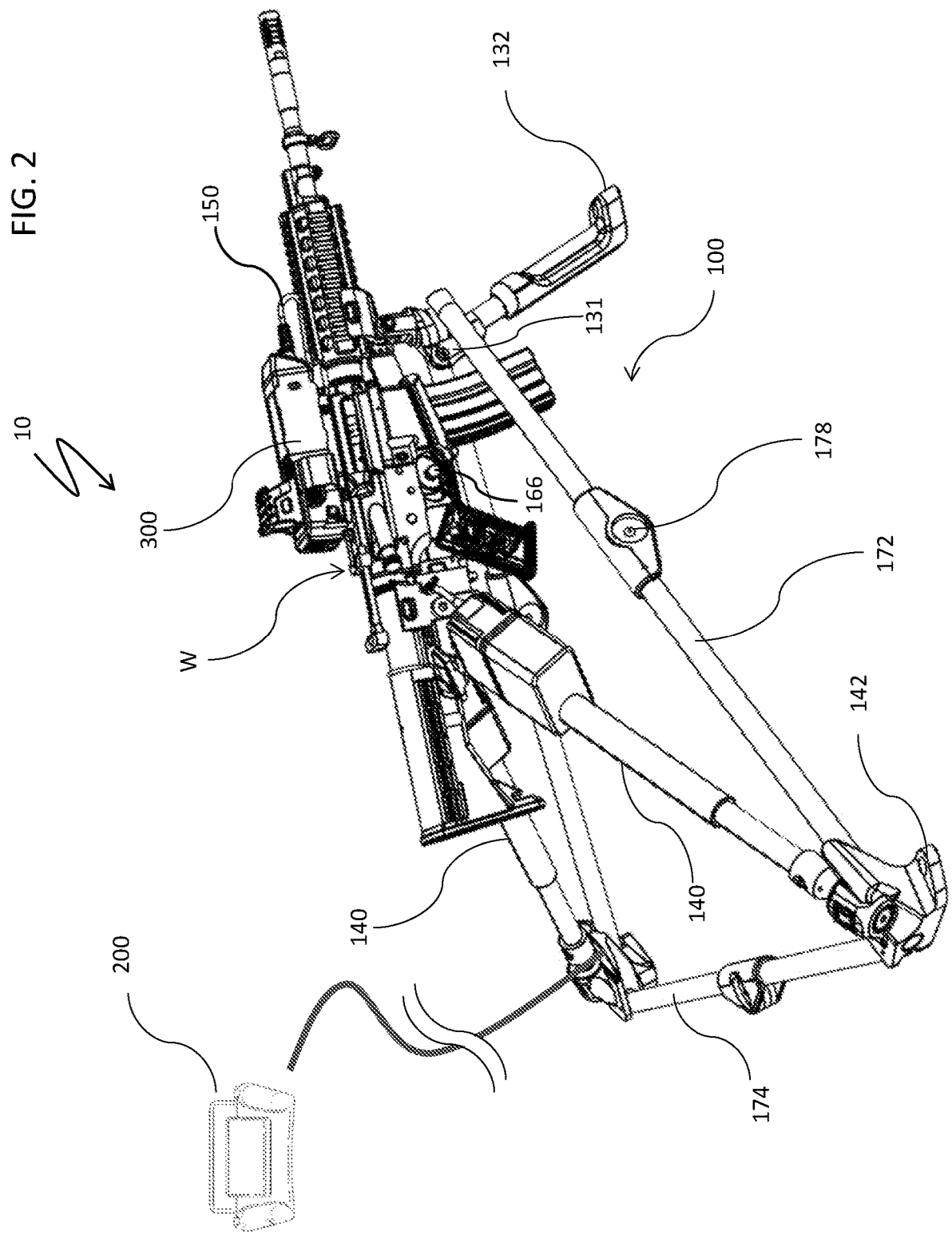
FIG. 2 is an isometric view of an implementation of the RCWS of FIG. 1 using a foldable adjustable weapon support and the dual-mode FCS of FIG. 1 mounted on a weapon.
Figure 3A:
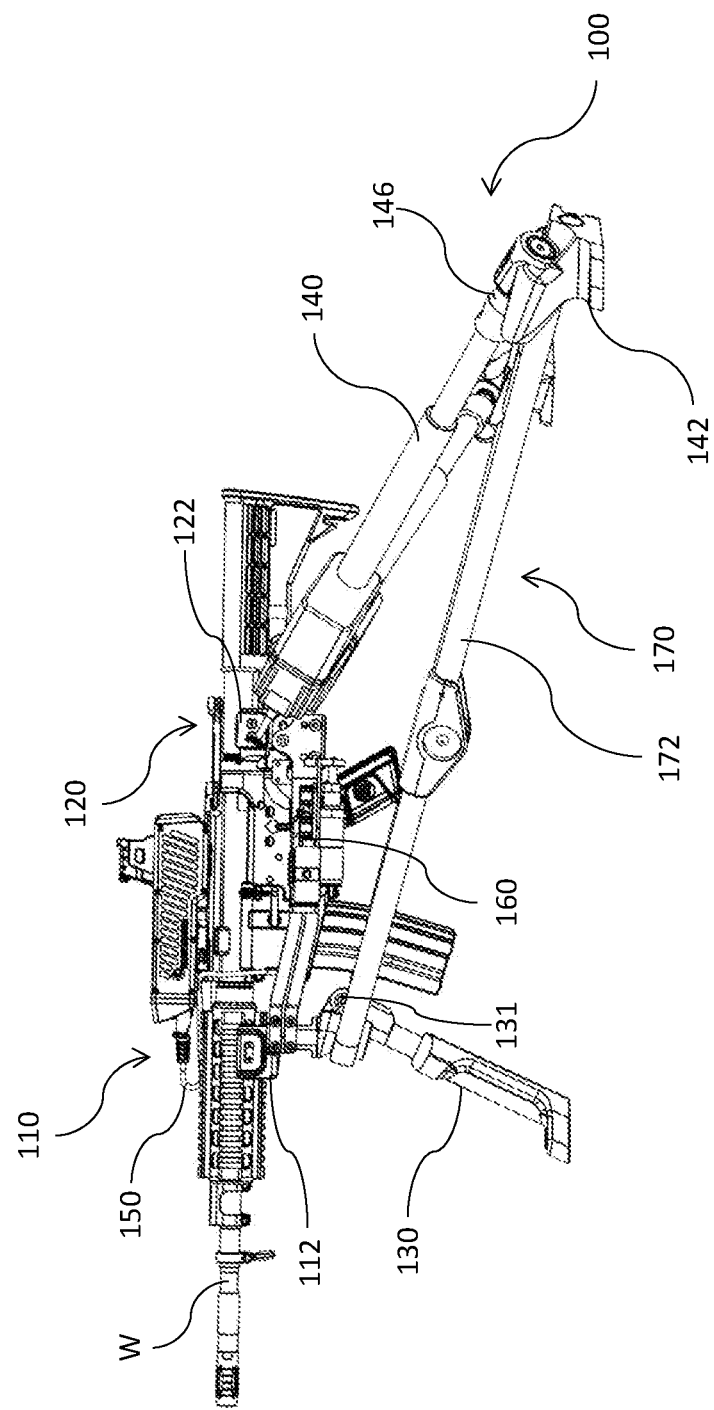
FIG. 3A is a side view of the RCWS of FIG. 2.
Figure 3B:
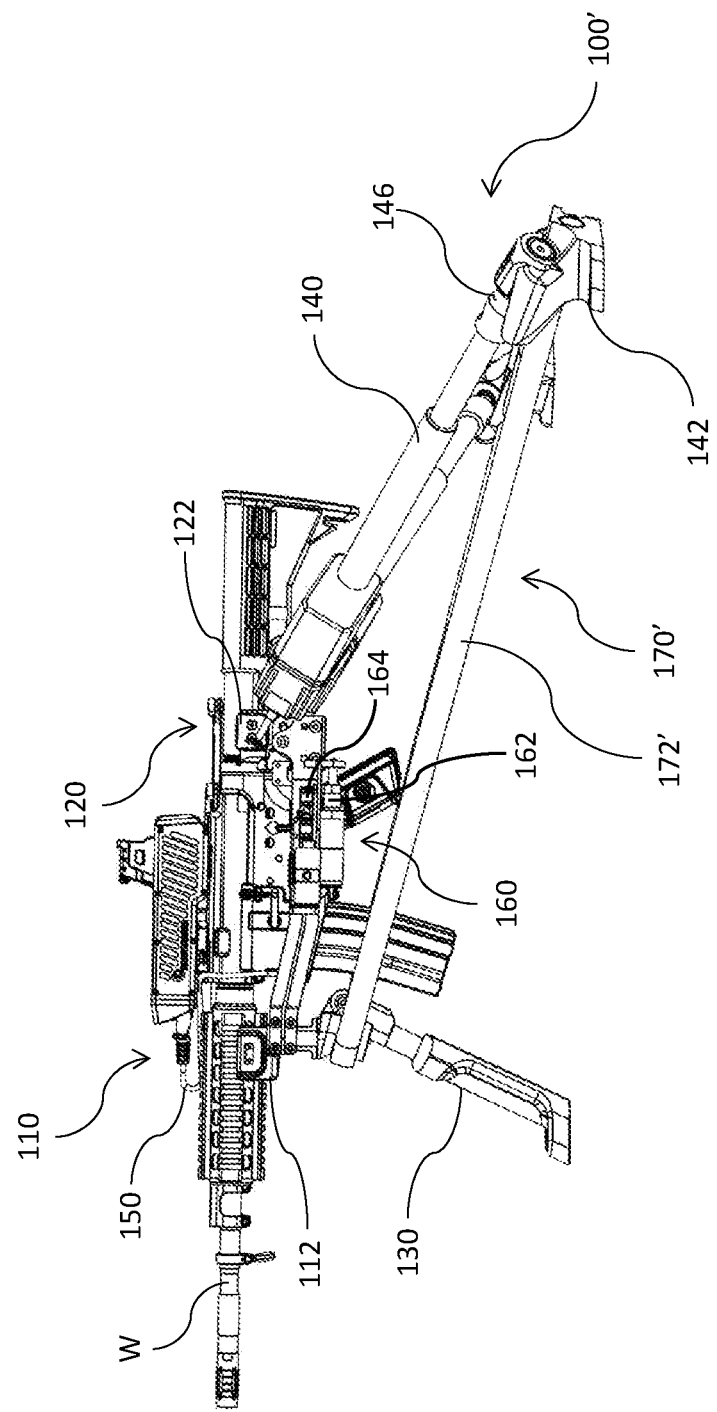
FIG. 3B is a view similar to FIG. 3A showing a modified version of the foldable adjustable weapon support.

Remote controller 200 includes a processing system 230. The operator is able to remotely view the FOV of the imaging sensor of the FCS via a display 220. The display may be any display known in the art, but preferably a touch screen display. The touch screen display may double as a user input interface 240. Alternatively, or additionally, the remote controller console 200 includes functional buttons, switches and/or other input mechanisms which function as the user input interface 240. The remote controller 200 has an independent power source 280. Additionally, or alternatively, the controller may receive power from the support 100 or provide power to the support. Referring now to one particularly preferred but non-limiting implementation of adjustable weapon support 100, FIG. 2 illustrates a right-side isometric view of a Remote-Controlled Weapons System 10 that includes a foldable, remotely controllable support 100 for a weapon W with a weapon mounted RCS 300 and a remote controller 200 according to the present innovation. FIG. 3A is a left-side view of an embodiment of the innovative support 100. The foldable support is adapted to be a free-standing assembly upon which a firearm can be seated and secured in place. FIG. 3B is a left-side view of another embodiment RCWS, including an innovative support 100'.

Figure 4A:
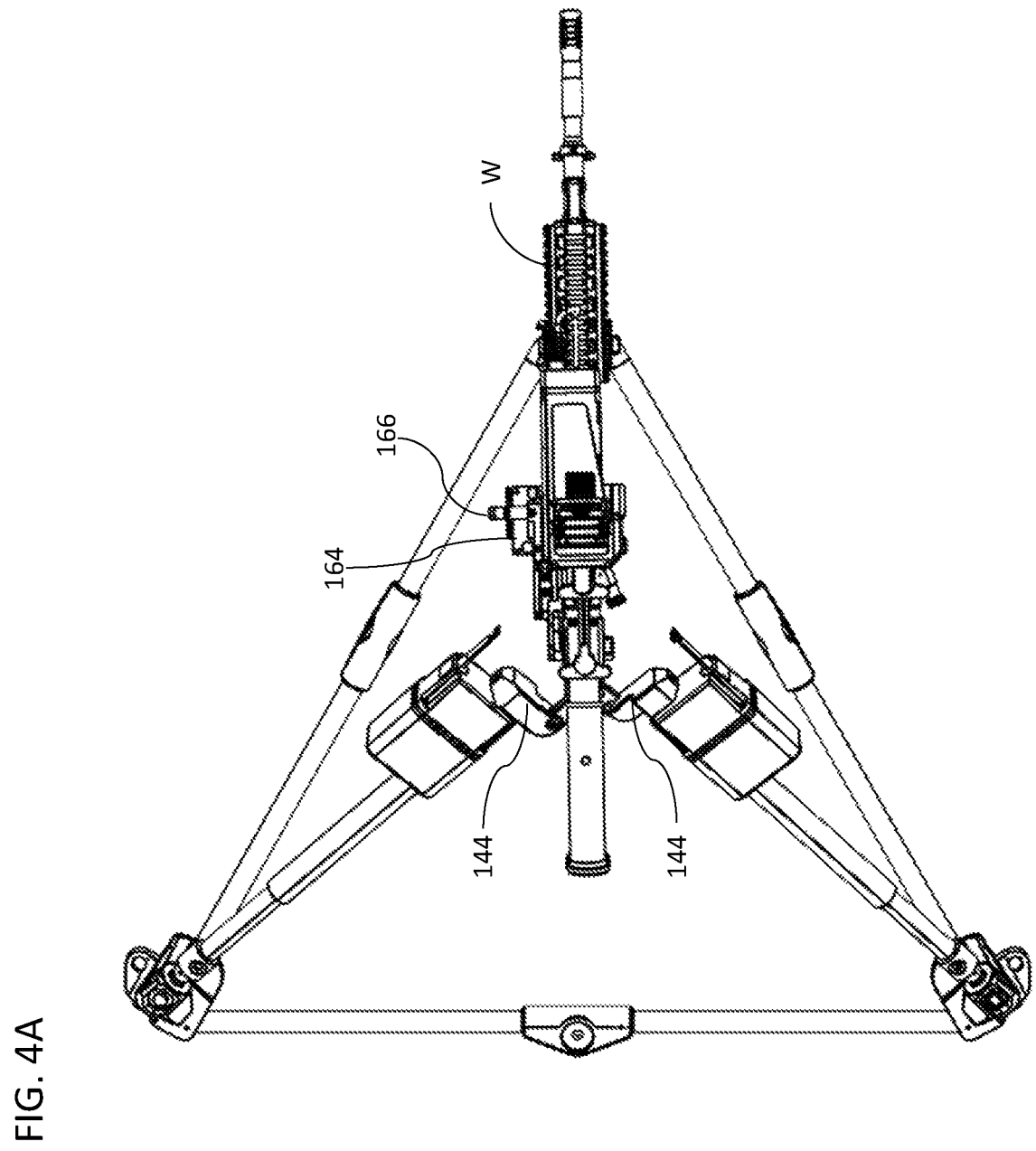
FIG. 4A is a top view of the RCWS of FIG. 2.
Figure 4B:
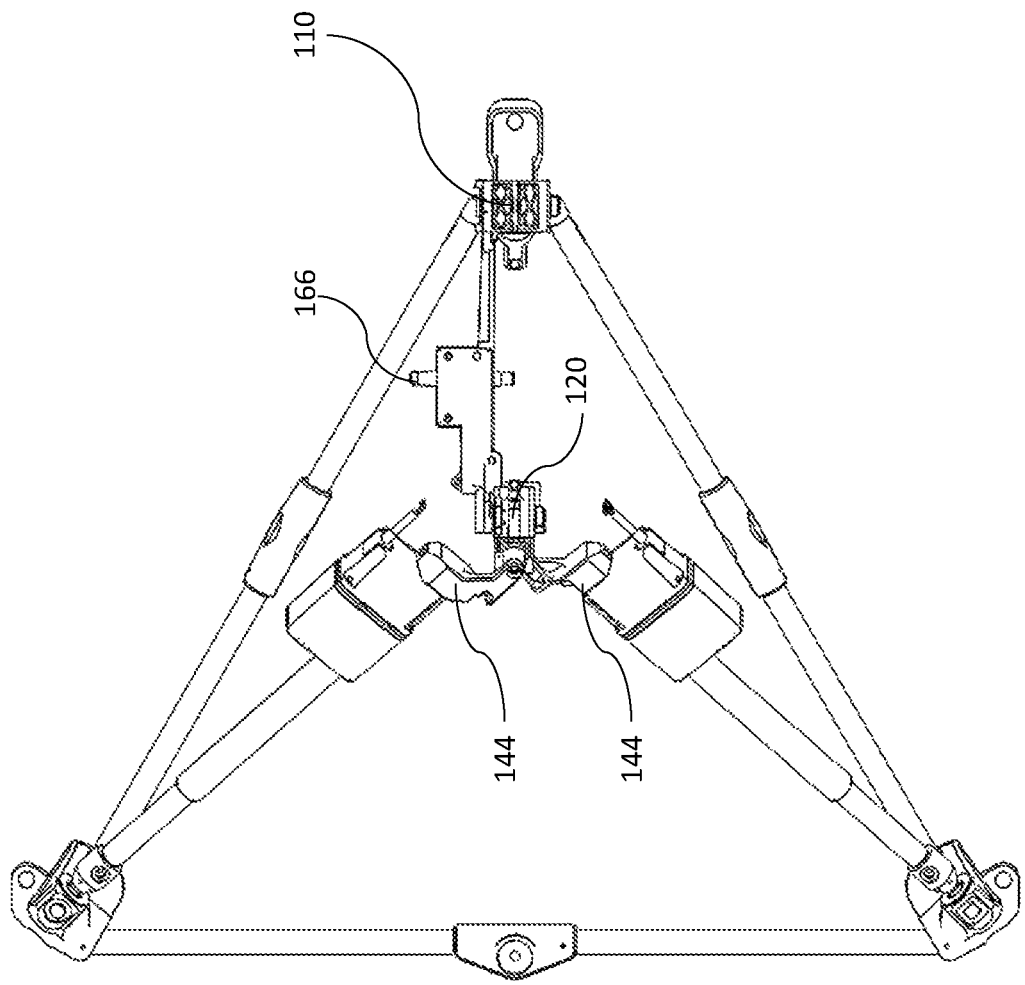
FIG. 4B is a top view of the adjustable weapon support of FIG. 2 with the weapon and FCS removed.
Figure 5A:
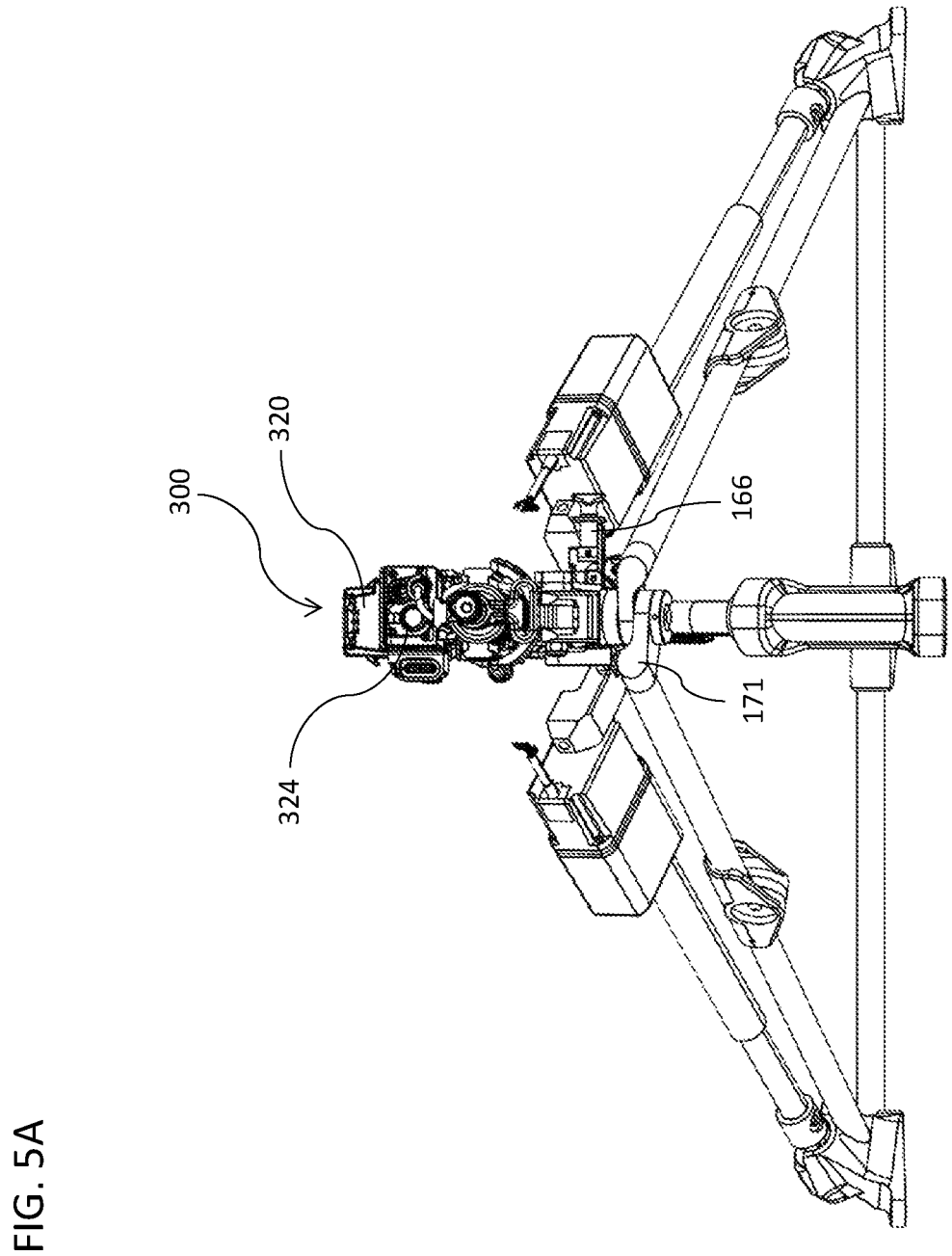
FIGS. 5A and 5B are front views of the RCWS of FIG. 2 shown with, and without, a camera integrated with the adjustable weapon support, respectively.
Figure 5B:
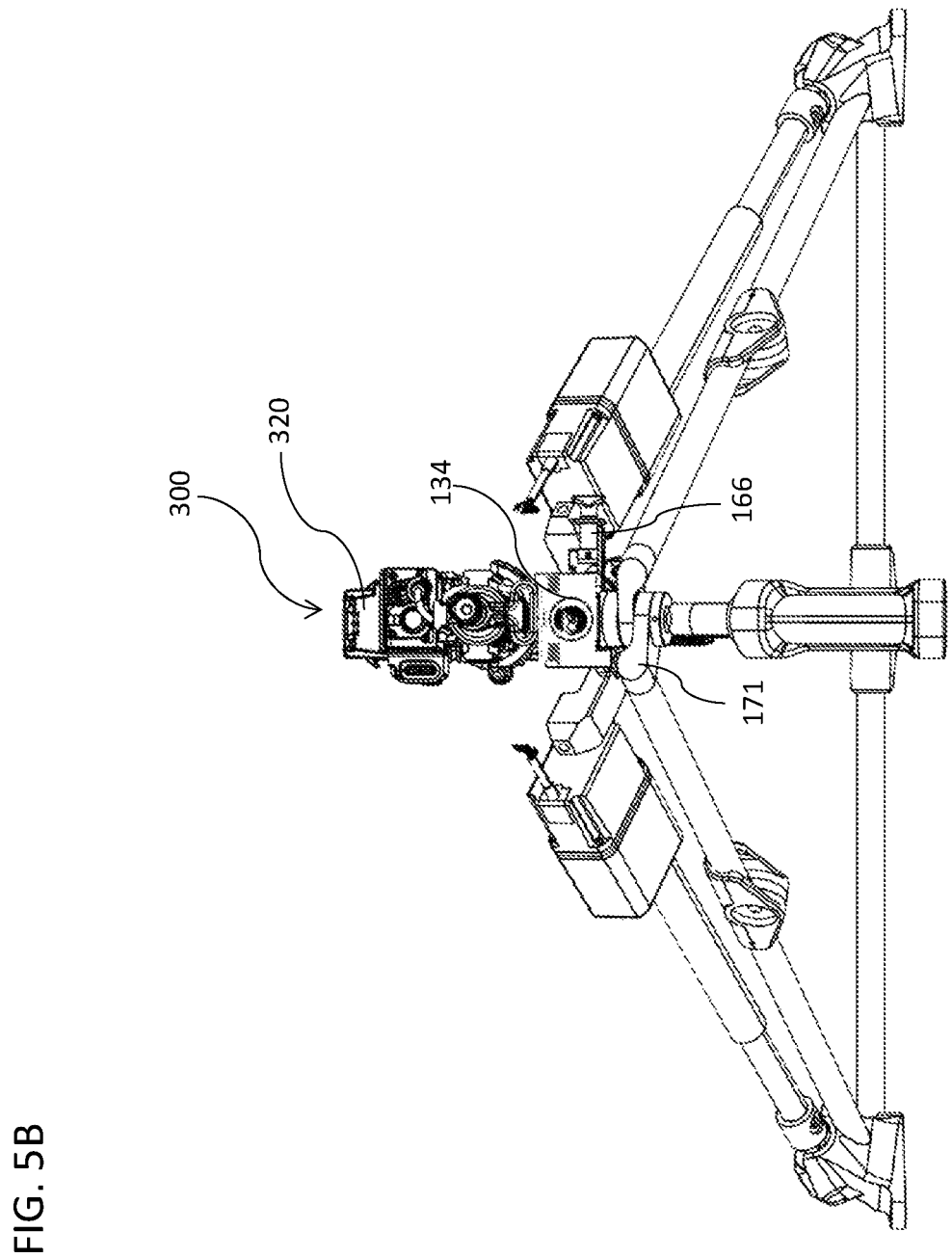

FIG. 4A is a top view of the support 100 with the weapon W secured to the support. FIG. 4B is a top view of the support 100 without the weapon W secured to the support. FIG. 5A is a front (barrel-end) view of support 100 with mounted weapon W. FIG. 5B is a front (barrel-end) view of another embodiment support 100 including a support camera 134.

FIGS. 6A, 6B and 6C depict various views the support of FIGS. 2-5 in a compact portable form. FIG. 6A is an isometric view of the support in the compact, portable form. FIG. 6B is side view of the same and FIG. 6C is a top view of the same.

The foldable support 100 includes first 110 and second 120 weapon attachment configurations for engaging two spaced-apart locations on the weapon. Exemplarily, the weapon attachment configurations 110, 120 are adapted to receive thereon a first location of the weapon, such as a handguard of a barrel, and a second location of the weapon such as a shoulder stock.

FIGS. 7A-7D are schematic diagrams showing four configurations, without details of the collapsible frame and other components. FIG. 7A corresponds to the configuration shown, at least, in FIGS. 2-6. The two actuators 140 connect to the coupling arrangement on the stock end (i.e., where the stock end of the weapon is to be positioned) and foldable leg 130 connects to the coupling arrangement on the barrel end (i.e., where the barrel end of the weapon W is to be positioned). FIG. 7B shows an alternative configuration in which the foldable leg 130 connects to the coupling arrangement on the shoulder stock end, and two actuators 140 connect to the coupling on the barrel end. In a third configuration, shown in FIG. 7C, there are two actuators 140 that are located where the stock end of the weapon is to be rested and a forward actuator 140 (in place of a foldable leg) in the location supporting the barrel end of the weapon. These elements can also clearly be reversered, using an actuator in place of leg 130 of FIG. 7B. In the fourth configuration, depicted in FIG. 7D, there are four actuators 140. Two actuators connect to the coupling arrangement where the stock end of the weapon is to be positioned and another two actuators connect to the coupling arrangement where the barrel end of the weapon is to be positioned. Details of possible implementations of the configurations of FIGS. 7B-7D will be clear to a person ordinarily skilled in the art on the basis of the detailed example of the configurations of FIG. 7A given with reference to FIGS. 2-6 herein.

Referring again to the configuration depicted in FIGS. 2-6, the first weapon attachment configuration 110 is coupled to the second weapon attachment configuration 120 via a bridge 114 (FIG. 6) which maintains the desired spacing of the weapon attachment configurations, i.e., to avoid slipping of the attachment configurations along the weapon. In some embodiments, the second weapon attachment configuration 120 is slidably movable along bridge 114 to adapt the support for weapons of different lengths.

While the following description details the configuration shown in the figures, it is made clear that any arrangement for holding the weapon in place on the support is considered to be within the scope of the invention. Accordingly, the exemplary system illustrated here includes a collapsible support structure 105 and electromechanical actuators 140 that are operated in a coordinated manner to move a mounted weapon W in elevation and azimuth. A weapon can be releasably coupled to the support once erected, using any coupling arrangement or mechanism. The collapsible support structure illustrated here includes a foldable leg and a collapsible reinforcement frame selectively providing rigid interconnection between the bases of each of the two linear actuators and the foldable leg. The support structure is collapsible to provide a compact portable form of the support. The two linear actuators are adapted to be angularly spaced apart and are axially coupled to the foldable leg. The linear actuators are adjustably coupled to the coupling arrangement.

The first and second weapon attachment configurations further include a means of securing the weapon in place on the support. An exemplary configuration 112, 122 for securing the weapon is a U-shaped receptacle for receiving the lower surface of the weapon (e.g., stock or barrel) and adapted to rigidly hold the weapon in place, for example having a spring-loaded pin or similar appendage that tensions or locks the weapon in place. Another exemplary configuration 112, 122 for securing the weapon is a U-shaped support for receiving the lower surface of the weapon (e.g., stock or barrel handguard) together with a flexible rubber strap which can be fixed to the support on one end and free on the other end. The strap is adapted to be stretched over the respective weapon location (e.g., stock or barrel handguard) and pulled taut before the free end of the strap is secured to the support on the other side of the weapon, with the weapon trapped between the strap and the weapon attachment configuration.

To be clear, in the example illustrated here, the support 100 is adapted to receive the weapon such that the handle and magazine extend from the weapon towards the ground (or surface upon which the support is standing), the muzzle in line with the front leg and the stock located between the two actuators. However, it is made clear that other configurations of the weapon support may be adapted to receive a weapon lying on its side or upside down.

The support illustrated here further includes at least one foldable leg 130 supporting the first weapon attachment configuration 110. According to the present configuration, depicted in the Figures, the foldable leg 130 supports the first weapon attachment configuration 110 which is adapted to receive the muzzle-end of the weapon W.

In some embodiments, the foldable leg 130 includes a selectable height mechanism 132 by which the foldable leg can be raised or lowered. (In some embodiments, this mechanism may be electro-mechanical, such as an actuator.) According to this embodiment, a foot 132 of the leg 130 is adapted to extend from the leg with one or more locking positions. The adjustable length of the front support also facilitates deployment of the RCWS on uneven terrain, such as on a slope of a hill.

A further optional feature is a camera (imaging sensor) 134 integrated in the foldable leg 130 and pointing in the same direction as the weapon W. Preferably, imaging sensor 134 is a wide-angle image sensor. The wide-angle image sensor is intended to supplement a narrow FOV sensor on the weapon (discussed elsewhere herein), for situational awareness and improved target acquisition. In some embodiments, the integrated image sensor 134 (hereafter 'support camera') can be used with a weapon-mounted laser for bore-sighting between the weapon camera and the support camera 134. Additionally, or alternatively, image processing techniques may be used to register the location of the narrow FOV image sensor mounted on the weapon within the wide FOV (W-FOV) images from support camera 134. Alternatively, the support camera may be a different type of target detecting sensor, such as, but not limited to, LIDAR, RADAR, thermal imager, etc. According to some embodiments, support camera 134 is an image sensor with an additional sensor collocated with the camera 134. As a further option, the adjustable weapon support may be provided with a microphone for capturing sounds in the vicinity of the system and relaying them to the remote operator and/or for generating acoustically-triggered event warnings which are notified to the remote user for further investigation. As with all other aspects of processing performed by the present invention, the required processing for any of the above sensor types may be performed at any location, or split between multiple locations, including in the FCS, in a processing system of the adjustable weapon support, at the remote control interface, or in a remote network or using remote cloud computing resources.

The support 100 further includes two angularly-spaced linear actuators 140 supporting the second weapon attachment configuration 120. The actuators are angularly spaced when attached to the second weapon attachment configuration. Each actuator has a proximal end and a distal end. The proximal end is coupled to the second weapon attachment configuration 120 and the distal end is connected to a base 142 of actuator. The bases 142 are also coupled to, and form part of, the reinforcement frame 170 detailed below.

The distal ends of each of the actuators are coupled to a respective base 142 via a coupling 146. The depicted coupling is a ball in socket coupling, however, this is merely exemplary and not intended to be limiting. The coupling 146 may also have swivel capabilities. The coupling 146 allows the actuators to be arranged in the compact portable form depicted in FIGS. 6A-C after being disengaged from the second weapon attachment configuration. The actuators can be swiveled about the axes of the respective couplings to each lie parallel to a respective rigid support rod.

The proximal end of each actuator terminates in a coupling piece 144 which detachably attaches to a corresponding receiving piece on the second weapon attachment configuration 120. Preferably the coupling arrangement is a ball and socket arrangement. Accordingly, coupling piece 144 may be the ball component of the ball and socket arrangement or it may be the socket component. A ball and socket arrangement gives the apparatus a great deal of maneuverability. The coordinated linear movements of the linear actuators provide a limited pan (azimuth) capability as well as a tilt (elevation) capability. The first weapon attachment configuration 110 is attached to the foldable leg via a hinged and/or swivel coupling to facilitate the pan and/or tilt movement of the weapon while the foldable leg 130 remains stationary. The linear actuators 140 work in coordination to maneuver the weapon support. When a weapon is secured on the support, the linear actuators move (under control of the FCS, detailed elsewhere herein) to track a target, preferably for the purposes of firing on the target. The collapsible support structure 105 refers to the weapons attachment configurations, the bridge, the support frame, bases, the foldable leg and all the coupling pieces.

The linear actuators 140 may be implemented using any suitable technology. In one exemplary but non-limiting example, the linear actuators are screw actuators operated by small electric motors. In other exemplary but non-limiting examples, the linear actuators are hydraulic or pneumatic actuators.

In some embodiments, the linear actuators can be controlled remotely by an operator via a remote controller or "console" 200. The console 200 is in electrical communication with support 100 either via wired means 250 or wirelessly. The remote console 200 operator uses the weapon imaging sensor and/or the support camera 134 to visually locate a target on the display of the console (which corresponds to the FOV of the FCS imaging sensor, and in some cases to the FOV of the support camera) and select the target for tracking and firing. Once a target is selected and locked (a one- or two-step process), and the electrical command for firing has been provided, the FCS manipulates the support to track and fire on the target. In some embodiments, it may be necessary to separately enter a firing command for the FCS to fire on the target.

In some embodiments, in addition to the FCS controlling movement of the support to track and/or fire on the target, the console 200, e.g., a tablet or specialized remote control, can also directly control the movement of the support which is effected by the linear actuators. For example, the console operator can pan and/or tilt the weapon (by manipulating the actuators) in search of a potential target or a particular target that is not currently in the FOV of the weapon/support camera. Now that the weapon has been moved and a desired target is visible in the FOV of the weapon and/or the support camera, the operator transfer control of the support to the FCS as above.

In embodiments, the remote control may include additional features such as, but not limited to, directly controlling the firing mechanism, controlling a cocking mechanism (where such a mechanism exists on the support/platform), enabling a non-lock-on mode (an optional feature of the weapon-mounted FCS) whereby the FCS initiates or enables firing at any moving or recognized or identified target, remotely enabling an autonomous mode, etc. In a fully autonomous mode, these additional functions may be actuated autonomously, according to the requirements of the particular application.

In the second, master mode, the Fire Control System (FCS) mounted on the weapon is electronically coupled to the remotely controlled weapon support 100 and the weapon W is mechanically coupled to the weapon support. The FCS on the weapon provides a layered approach including detection, tracking, calculating a firing solution and actuating the firing mechanism. Once the operator selects a target (via the console 200) that is to be fired upon, the FCS tracks the target and moves the weapon to attain the firing solution and then fires the weapon. To be clear, once selection has occurred (see below for additional details), the FCS controls the support 100 and manipulates the actuators 140 to move the firearm W until the boresight intersects with the target (or where the target will be) and then the FCS actuates the firing mechanism.

In this example of obliquely-oriented linear actuators, a software module translates the left, right, up and down movements (instructions that come from the FCS and/or remote controller) into changes in the length of the actuators by extending and/or retracting the actuators to make the weapon move in the required direction. This software module may be part of the FCS and/or part of the support and/or the remote controller.

The instant support 100 replaces the human operator who aims the firearm and depresses the trigger. A sighting unit/FCS 300 of the FCS (which has the same or similar detecting, tracking and fire actuation capabilities as the exemplary SMASH 2000 unit) is electronically connected to the support 100 via a cable 150. A controller/electrical interface 152 on the support 100 centralizes the actuator controls, the trigger-pulling mechanism controls and the camera controls and data transfer. The controller/interface serves as a gateway for commands from the sight and/or console which control the various mechanisms and components of the support through the controller.

The operator of the remote-control console 200 selects/locks onto one of the detected potential targets in the FOV of the sight and the FCS controls the actuators to move the firearm such that the boresight of the firearm intersects with the target (in the real world) and the projected digital barrel indicator (red-dot, reticle, crosshairs etc.) intersects with the projected target area marker (on the see-through display of the sight). The FCS computes the required aiming and the exact moment to fire the bullet so that the target will be hit.

The illustrated support 100 includes a trigger-pulling mechanism 160. The trigger-pulling mechanism can be considered a specific embodiment of the Fire Control Mechanism (FCM) which is discussed above. However, for the sake of clarity, this mechanism will only be referred to herein as a trigger-pulling mechanism.

The trigger-pulling mechanism 160 can be seen from various angles in FIGS. 2-5B. The mechanism includes an actuator mechanism 162 and spring-loaded actuator arm 164. A displaceable shaft 166 is coupled to the actuator arm. The shaft 166 is inserted into the trigger guard when the weapon is mounted on the support. The shaft engages the trigger when actuated. The exemplary actuator mechanism 162 is a linear actuator mechanism that moves the arm backwards on command, pulling the shaft against the trigger to actuate firing of the weapon. Shaft 166 can be seen in FIG. 2 as well as in FIGS. 4A and 4B. In FIGS. 4A and 4B the shaft is in a first position outside of the trigger area. The shaft can be moved inside the trigger area once the weapon is secured onto the support structure 100.

There are two potential manners of actuating the firing mechanism: in collaboration with a FCM and independent of any FCM. The first manner is the same as the manner in which a human operator fires a weapon that has a modified grip with an integrated FCM. That is to say that the once a target has been locked onto and the command to fire has been given (if these two steps are separate, which they may or may not be), all via the remote console 200, the actuator engages and depresses the trigger while the FCM prevents the trigger from being actuated. All the while the FCS is actively moving the firearm to try and acquire a firing solution on the locked-on target. As soon as the FCS determines that the target will be hit, the FCM allows actuation of the trigger and the trigger-pulling mechanism pulls the trigger to fire the weapon.

In the second manner of firing the weapon, the FCS instructs the trigger-pulling mechanism 160 to pull the trigger when the processing system determines that the target will be hit. In this case, the FCM of the FCS (if present) is disabled in this mode, and the trigger-pulling mechanism 160 of the adjustable weapon support functions as an alternative FCM. According to the exemplary implementation of the trigger pulling mechanism depicted in FIG. 5, when the FCS instructs the trigger-pulling mechanism 160 to fire, the linear actuator 162 moves the actuator arm 164 towards the butt of the weapon such that the shaft squeezes the trigger and causes the weapon to fire.

The preceding discussion is relevant to a weapon with a trigger that is manipulated (pulled) to effect firing. However, it is made clear that the depicted mechanism is merely exemplary and that the trigger pulling mechanism is a term intended to include any relevant mechanism that actuates a firing control of a weapon, where the trigger pulling mechanism is adapted to correspond to the manner of actuation of the firing control (e.g., pushing a button).

In embodiments with an integrated camera in the support, i.e., support camera 134, the support camera is preferably a wide-angle camera. As mentioned elsewhere, there may be one or more additional sensors (LIDAR, RADAR, etc.) that can sense a target in other modalities. In some embodiments, one of these additional sensors may detect a potential target whereby the support camera (and/or the weapon-mounted imaging sensor) can be redirected to detect and/or track the potential target.

In preferred embodiments the operator selects a target from the support camera video. In embodiments, the operator can select the target from either the support camera video or from the weapon sight video. In embodiments, the operator can select the target from the weapon sight video.

In embodiments, selection of the target causes the support 100 to move the weapon W to track the target, so that, when a fire command is received, the weapon is already correctly aligned and can immediately fire. In some embodiments, the operator can manually move the support (i.e., control the actuators 140). In some embodiments, the operator can manually fire the firearm. In other implementations, or modes of operation, the remote weapon system may operate autonomously.

The support 100 may have its own power source such as a rechargeable battery or may draw power for the actuators (and support camera, if used) from the rechargeable battery of the FCS and vice versa (as discussed above).

The instant, dual-mode weapon-mounted FCS can be mounted on any compatible support platform with pan and tilt capabilities. The exemplary support 100 further includes a collapsible reinforcement frame/support structure 170. The frame 170 is collapsible to provide a compact portable form of the support. FIGS. 6A-C depict the foldable support 100 in the compact portable form.

Reinforcement frame 170 includes two foldable, angularly spaced apart supporting rods 172, and a third, foldable cross member 174. The supporting rods 172 and cross member 174 form an isosceles triangle with the supporting rods converging to a point and the cross member 174 forming a base of the triangle. The reinforcement frame 170 is adapted for selectively providing rigid interconnection between bases 142 of each of the two linear actuators 140 and the first weapon attachment configuration 110/foldable leg 130.

To be more precise, the first weapon attachment configuration is operationally coupled to a post (having a substantially vertical axis) in a manner which allows freedom of movement of the first weapon attachment configuration relative to the stationary foldable leg 130 (for example FIG. 3A). Each of the two rods 172 of the reinforcement frame is axially coupled to the post by a respective swivel arrangement 171 (see for example FIG. 5A) which allows the rod to swivel horizontally about the post to lie parallel to the other rod 172 or to be angularly spaced apart from the other rod.

Each supporting member 172 is made up of two parts hingedly coupled together by a folding hinge 178 disposed between the two parts. The two-part supporting rod 172 has an extended state and a folded state whereby one part of the supporting member swivels approximately 180° about hinge 178 to lie flat against the other part of the supporting member.

The foldable cross member 174 is disposed between bases 142. The foldable member includes a hinge 176 disposed at the midpoint of the cross member 174. When the cross member is unfolded and locked open, the supporting rods are angularly spaced apart. When the cross member is folded closed, the supporting rods lie next to each other.

Another embodiment of the foldable frame is shown in FIG. 3B. FIG. 3B depicts a modified support 100' wherein each of the foldable supporting rods 172 is substituted with a non-folding supporting member 172'. All the other components are the same as those found in the support 100. The substitution of the supporting rods 172 with the non-folding supporting members 172' lengthens the overall length of the apparatus when in the compact, portable form of the support 100' relative to the overall length of the support 100 in the compact, portable form. As such, this second embodiment is less preferable.

The versatility of the support is such that a soldier can set up the support 100 and then attach his or her personal weapon (e.g., an M4 rifle mounted with an FCS sight) onto the support. The personal weapon can now be remotely controlled by the soldier or another individual.

The weapon W is seated on the first and second weapon attachment configurations and secured in place by securing means. The shaft 166 of the trigger-pulling mechanism 160 is inserted in the trigger guard. The support controller is electronically coupled to the FCS sight by plugging cable 150 into a dedicated communication (and in some cases power) port on the sight module. The FCS 300 is turned on and the console 200 activated. The system is now ready for action.

Figure 8:
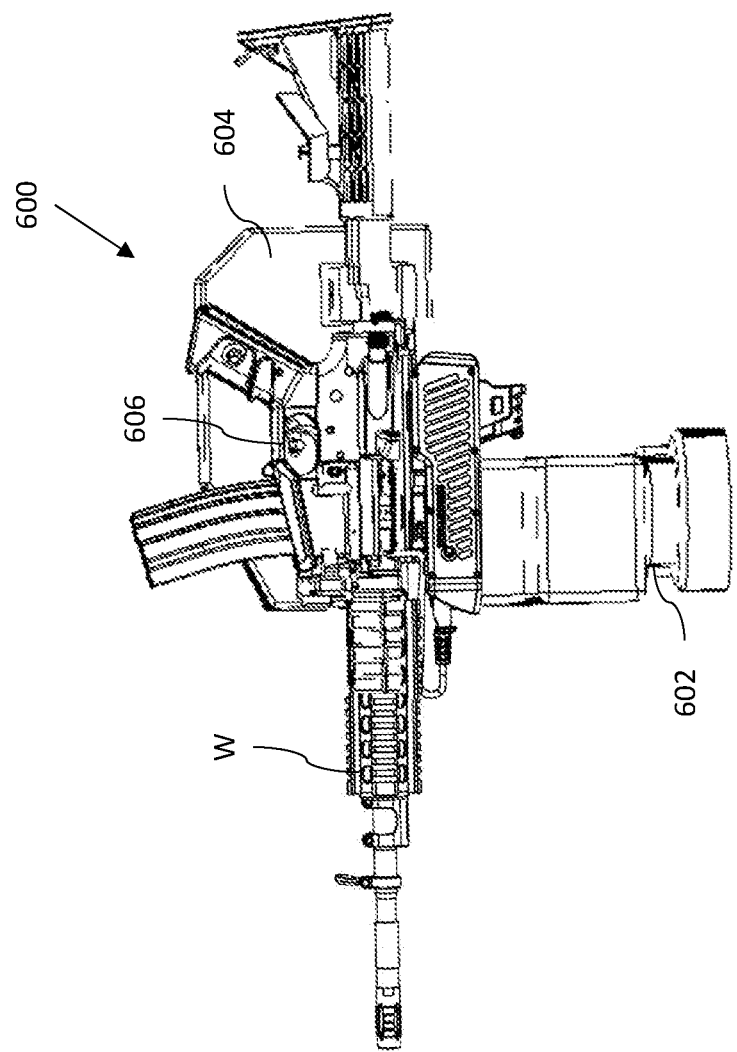
FIG. 8 is a schematic side view of an alternative implementation of the RCWS of the present invention employing a two-axis rotary orienting device as the adjustable weapon support.

FIG. 8 is a schematic illustration of an alternative implementation of an adjustable weapon support 600 for supporting and operating a weapon W. In this case, the support includes a rotary azimuth actuator 602 and a rotary elevation actuator 604, as well as a remotely operated trigger pulling mechanism 606. The weapon W is shown here mounted upside down relative to its orientation during normal handheld use. Other than the mechanical implementation of the weapon support and movement, the various other internal components and functionality of adjustable weapon support 600 are analogous to those described with reference to adjustable weapon support 100 described with reference to FIG. 1 and FIGS. 2-6, above, and will be clear to a person ordinarily skilled in the art on the basis of that description.

FIG. 9 is a high-level flowchart illustrating the operation of the dual-mode weapon-mounted FCS according to an embodiment of the present invention. In particular, the flowchart corresponds to the control operations performed by various modules of the processing system 330 of the FCS. First, at step 500, the FCS determines in which mode it is to operate. This switching between modes may optionally be performed automatically, for example, by detecting when the FCS interface 370 (wired or wireless) has been connected to the corresponding interface of the adjustable weapon support, thereby indicating that operation should be according to the RCWS mode of operation 504, and if not, operating in the handheld mode 502. Alternatively, switching between modes may be performed according to a user input.

In handheld mode 502, the system typically displays an image from the imaging sensor 324 (step 506) to allow the user to view and select the desired target. This is true for an electronic sight which presents an image on a display, particularly for a night vision system. In some cases of a sight for use in daylight, the target may be viewed directly via an optical sight, such that the images are not displayed, but merely provided to the system. The FCS then receives a target selection input (step 508), which indicates to the system the target at which the user wishes to fire. This input may be entered via a dedicated button located, for example, on the barrel handguard, the weapon grip or on the trigger guard. Alternatively, in some cases, the input may be generated by a sensor associated with the trigger which is actuated by half-pressing the trigger insufficiently to cause firing.

The processing system then performs target tracking (step 510). Most preferably, image processing and/or artificial intelligence algorithms are applied to the sampled image to determine an effective hit area for the target within which a "hit" is expected to be effective. This may include algorithms for classifying the type of target together with definitions of the effective hit area for each type of target. The tracked target is preferably indicated to the user via the targeting display 322, which may be an overlay over the directly-viewed target seen via the optical sight 320.

The processing system preferably also determines an aim-region with which the weapon should be aligned for firing in order to strike the target (step 512). The "aim-region" takes into consideration additional information, such as range to target, weather conditions, ballistic properties of the weapon and the round etc., which may be derived from image processing, additional sensors associated with the FCS and/or provided from outside sources. The "aim-region" preferably defines the direction in which the barrel should point at the moment of firing in order to achieve a high likelihood of an effective hit on the target, and varies dynamically with tracking of the target. Its position relative to the weapon sight also varies dynamically with motion of the weapon barrel.

Although particularly preferred implementations of the present invention include calculation of the "aim region" based on range, ballistic properties etc., the invention is not limited to such systems. Particularly for relatively short ranges, or any case where ballistic corrections are small compared to the target size, the "aim-region" may be approximated adequately by the effective hit area of the target, or even simply by the tracking point on the target, or some predefined area around the tracking point.

The processing system then generates an output to facilitate accurate firing of the weapon (step 514). Depending on the implementation, this output may be an output to a display for indicating the aim region to a user of the weapon, which is displayed at step 516. The "indication" of the aim region may be either a direct display of the aim region on the display, and/or may be achieved by a corresponding but opposite displacement of the aim crosshair away from the geometrical boresight direction. In some cases, the indication of the tracked target relative to the crosshair becomes an indication of the aim region, which may or may not be displayed. In other cases, the aim region location may compensate for target lead, while the crosshair position compensates for ballistics and wind effects. Other combinations of compensation are also possible. In each case, the user brings the cross-hair into the aim region in order to fire and hit the target.

Additionally, or alternatively, the output may contribute directly to timing of the weapon firing when the weapon is correctly aligned with the aim region, typically by selectively removing blocking of firing only when the weapon is correctly aligned (step 517). This function, together with the visual feedback to the user showing the target being tracked, provides the user with the confidence that he or she will only fire on the locked-on target. When the user pulls the trigger, the system thus delays firing until the weapon is aligned effectively with a location within the target aim region for the tracked target, and then fires the weapon (either actively or by removing an obstruction to the user firing input, as discussed earlier). This completes the use cycle for handheld mode, which can then be repeated.

In RCWS mode 504, images from imaging sensor 324 are preferably transmitted to the remote controller 200 for viewing by the remote operator (step 518). This transmission is typically performed by relaying the images via interface 370 to the communications subsystem 190 of the adjustable weapon support, which transmits them to the remote controller, or directly from the FCS to the remote controller, where communications subsystem 190' is provided. At this stage of operation, various additional aspects of remote control of the adjustable weapon support 100 via remote controller 200 may be implemented, such as viewing by the user of wide FOV images from imaging sensor 134 (if present) and controlling the pointing direction of the weapon by remote control of the electro-mechanical actuators 140 so as to bring the weapon into rough alignment with the desired target. These remote control functions may optionally be implemented without involving the processing system of the weapon-mounted FCS, and are therefore not shown in FIG. 9.

The FCS then receives a target selection input (step 520), preferably corresponding to a location designated by the remote operator within the images from imaging sensor 324 as displayed at remote controller 200. In certain implementations, other data is also transferred between the FCS and/or adjustable weapon support and the remote controller. This may include one or more of the following: indication of potential detected targets for display on the screen; the state of tracking and current tracking position for display on the video images at the remote controller; information regarding battery status, and various other control signals, for example, for setting modes of operation or other settings.

The processing system then preferably performs tracking (step 522) and determines a target aim region (step 524) in a manner analogous to steps 510 and 512 discussed above. In this case, the processing system also determines an alignment correction required in order to correctly align the weapon with the target aim region and generates corresponding actuator control signals to electro-mechanical actuators 140 to adjust the weapon aim direction (step 526). The mapping of the required aim direction displacement to actuator displacements is clearly a function of the type and geometry of the actuators, but can be preprogrammed for any particular adjustable weapon support design and/or can be self-calibrating as the FCS monitors the effect of each displacement. These actuator control signals are preferably generated continuously (or rapidly repeated) during ongoing tracking of the target in order to effect closed loop alignment correction to maintain the weapon pointing towards the target.

The images from imaging sensor 324 are preferably displayed to the remote user via display 230 continuously in real time during this tracking process, preferably combined with a visual indication of the tracked target as soon as tracking 522 begins, thereby showing the operator clearly what target is being tracked, and allowing the operator to confirm the target by a suitable input. Optionally, a laser range finder may be operated automatically to determine the range to the target, and the aim-region updated according to ballistic calculations based on the range. On receipt of a target confirmation input (step 528), relayed back from the remote controller to the FCS, the processing system actuates firing at the target (step 530), preferably subject to the weapon alignment being within the target aim region, which typically results inherently from the ongoing tracking and alignment processes 524 and 526. This completes the cycle of operation of the RCWS mode 504, which can then be repeated.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A weapon-mounted Fire Control System (FCS) for a handheld weapon, the FCS comprising:
    (a) an imaging sensor deployed for sampling images of a target; and
    (b) a processing system comprising at least one processor, said processing system receiving images from said imaging sensor, said processing system being configured:
        (i) to operate in a first mode for handheld operation of the weapon wherein said processing system tracks a target in images from said imaging sensor during motion of the weapon while the weapon is handheld, determines an aim-region with which the weapon should be aligned for firing in order to strike the target, and generates an output to facilitate accurate firing of the weapon towards the aim region, and
        (ii) to operate in a second mode when the weapon is mounted on an adjustable weapon support having at least one actuator wherein said processor tracks a target in images from said imaging sensor, determines an aim-region with which the weapon should be aligned for firing in order to strike the target, and generates output signals for controlling operation of the at least one actuator in order to align the weapon with the aim region.

2. The FCS of claim 1, further comprising a display, and wherein said output to facilitate accurate firing of the weapon towards the aim region includes an output to said display for indicating the aim region to a user of the weapon.

3. The FCS of claim 1, wherein said output to facilitate accurate firing of the weapon towards the aim region includes an output to a firing control mechanism for actuating, or deactivating prevention of, firing of the weapon when the handheld weapon is aligned with the aim region.

4. The FCS of claim 1, further comprising a firing control mechanism for selectively preventing firing of the weapon, said firing control mechanism preventing firing of the weapon after pulling of a mechanical trigger of the weapon until said output is received from said processing system.

5. The FCS of claim 1, further comprising at least one interface associated with said processing system for connecting said processing system with the adjustable weapon support, said processing system being responsive to connection of said interface to the adjustable weapon support to switch from said first mode to said second mode.

6. The FCS of claim 1, further comprising:
    (a) a remote-control weapon system interface including a display and a user input device; and
    (b) a communications system including a first subsystem associated with said processing system and a second subsystem associate with said remote-control weapon system interface, said communications system establishing a communications link transferring images from said imaging sensor to said remote-control weapon system interface for display to a user, and transferring a target selection input from said user input device to said processing system.

7. The FCS of claim 1, further comprising a trigger-pulling mechanism associated with the adjustable weapon support and deployed for selectively pulling a trigger of the weapon.

8. The FCS of claim 1, further comprising an adjustable weapon support for receiving the weapon in said second mode, said adjustable weapon support having at least one actuator, said processing system being configured to acquire a target, to operate said adjustable weapon support to aim the weapon and to fire the weapon autonomously.

* * * * *